United States Patent
Sase et al.

(10) Patent No.: US 11,441,507 B2
(45) Date of Patent: Sep. 13, 2022

(54) DEVICE AND METHOD FOR DETECTING MISFIRE IN ENGINE

(71) Applicant: MITSUBISHI HEAVY INDUSTRIES ENGINE & TURBOCHARGER, LTD., Sagamihara (JP)

(72) Inventors: Ryo Sase, Tokyo (JP); Shintarou Noguchi, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 446 days.

(21) Appl. No.: 16/305,581

(22) PCT Filed: Mar. 21, 2017

(86) PCT No.: PCT/JP2017/011255
§ 371 (c)(1),
(2) Date: Nov. 29, 2018

(87) PCT Pub. No.: WO2018/146827
PCT Pub. Date: Aug. 16, 2018

(65) Prior Publication Data
US 2020/0232408 A1 Jul. 23, 2020

(30) Foreign Application Priority Data
Feb. 8, 2017 (JP) .............................. JP2017-021447

(51) Int. Cl.
| F02D 41/22 | (2006.01) |
| F02D 41/00 | (2006.01) |
| G01M 15/11 | (2006.01) |

(52) U.S. Cl.
CPC ........... *F02D 41/22* (2013.01); *F02D 41/009* (2013.01); *F02D 41/221* (2013.01); *G01M 15/11* (2013.01); *F02D 2200/1015* (2013.01)

(58) Field of Classification Search
CPC ................... F02D 41/22; F02D 41/221; F02D 2200/1015; G01M 15/11
(Continued)

(56) References Cited

U.S. PATENT DOCUMENTS

| 5,509,268 A | 4/1996 | Kurada et al. |
| 2010/0152991 A1 | 6/2010 | Suzuki |

(Continued)

FOREIGN PATENT DOCUMENTS

| DE | 10 2008 044 150 A1 | 6/2010 | |
| DE | 102008044150 A1 * | 6/2010 | ......... F02D 41/0007 |

(Continued)

OTHER PUBLICATIONS

International Search Report (form PCT/ISA/210) for International Application No. PCT/JP2017/011255 dated May 9, 2017.

(Continued)

*Primary Examiner* — Robert A Werner
(74) *Attorney, Agent, or Firm* — Birch, Stewart, Kolasch & Birch, LLP

(57) ABSTRACT

The present invention provides a device and method for detecting a misfire in an engine, the device being provided with: a rotation speed sensor (43) as a supercharger rotation speed measurement unit for measuring a rotation speed (Nt) of a supercharger (23); a misfire index calculation unit (51) that calculates a misfire index (Yt) from a degree of change in the rotation speed (Nt) of the supercharger (23), the rotation speed being measured by the rotation speed sensor (43); and a misfire determination unit (52) that determines a misfire in an engine (10) when the misfire index (Yt) calculated by the misfire index calculation unit (51) exceeds a pre-set determination value (D).

7 Claims, 6 Drawing Sheets

(58) Field of Classification Search
USPC .......................... 73/114.02, 114.04; 701/111
See application file for complete search history.

(56) References Cited

U.S. PATENT DOCUMENTS

| | | |
|---|---|---|
| 2012/0239311 A1 | 9/2012 | Hozumi et al. |
| 2015/0034046 A1 | 2/2015 | Takahashi et al. |
| 2017/0107924 A1* | 4/2017 | Blythe ................ F02D 41/0007 |

FOREIGN PATENT DOCUMENTS

| | | |
|---|---|---|
| JP | 2011-52698 A | 3/2011 |
| JP | 2014-234814 A | 12/2014 |
| JP | 2015-197074 A | 11/2015 |
| WO | WO 2014/195791 A1 | 12/2014 |

OTHER PUBLICATIONS

Written Opinion of the International Searching Authority(form PCT/ISA/237) dated May 9, 2017, for International Application No. PCT/JP2017/011255, with English translation.
Extended European Search Report dated May 24, 2019 issued in corresponding European Patent Application No. 17895674.4.

* cited by examiner

DEVICE AND METHOD FOR DETECTING MISFIRE IN ENGINE

TECHNICAL FIELD

The present invention relates to an engine misfire detection device and method for detecting a misfire in an engine.

BACKGROUND ART

PTL 1 discloses a device for detecting a misfire in an engine. The engine misfire detection device disclosed in PTL 1 executes air-fuel ratio F/B control based on a wide and linear air-fuel ratio signal in proportion to the oxygen concentration of exhaust gas discharged from an engine and detects a misfire in the engine in accordance with an air-fuel ratio AF during the control. Specifically, the detected air-fuel ratio is compared with a predetermined misfire determination value set in advance on the air-fuel ratio lean side, and the occurrence of the misfire is determined when the air-fuel ratio is leaner than the misfire determination value.

CITATION LIST

Patent Literature

[PTL 1] Japanese Unexamined Patent Application Publication No. 2014-234814

SUMMARY OF INVENTION

Technical Problem

The rotation speed of the engine, the air-fuel ratio, and the like fluctuate with vehicle operation states. A crankshaft is connected to a vehicle wheel, and thus fluctuations occur with the traveling resistance (traveling load) that is received from a step or the like during vehicle traveling on a rough road. Accordingly, it needs to be determined whether a decline in engine rotation speed and a decline in air-fuel ratio are attributable to a misfire or traveling resistance, and there is a possibility of wrong detection.

The present invention is to solve the above-mentioned problem, and an object of the present invention is to provide a device and method for detecting a misfire in an engine that enable high-accuracy engine misfire detection.

Solution to Problem

An engine misfire detection device according to the present invention for achieving the above object includes a supercharger rotation speed measurement unit measuring a rotation speed of a supercharger, a misfire index calculation unit calculating a misfire index from a degree of change in the rotation speed of the supercharger measured by the supercharger rotation speed measurement unit, and a misfire determination unit determining a misfire in an engine when the misfire index calculated by the misfire index calculation unit exceeds a pre-set determination value.

Accordingly, once the supercharger rotation speed measurement unit measures the rotation speed of the supercharger and the misfire index calculation unit calculates the misfire index from the degree of change in the rotation speed of the supercharger, the misfire determination unit determines a misfire in the engine when the misfire index exceeds the pre-set determination value, and thus a misfire in the engine is determined from the degree of change in the rotation speed of the supercharger. The rotation speed of the supercharger hardly fluctuates with vehicle operation states, and thus it is possible to detect a misfire in the engine with high accuracy.

In the engine misfire detection device according to the present invention, the misfire index calculation unit calculates the misfire index based on the degree of change in the rotation speed of the supercharger at a top dead center position of a piston entailed by crankshaft rotation.

Accordingly, if the engine undergoes no misfire when the piston is at the top dead center position, an in-cylinder pressure is at its maximum and rotation of a turbine rotated by exhaust gas from that cylinder also rises. Therefore, a misfire in the engine can be determined with high accuracy by a misfire in the engine being determined based on the degree of change in the rotation speed of the supercharger at this time.

In the engine misfire detection device according to the present invention, the misfire index calculation unit regards a decrease rate of the rotation speed of the supercharger at the top dead center position as the misfire index.

Accordingly, a misfire in the engine can be clearly determined by a misfire in the engine being determined based on the decrease rate of the rotation speed of the supercharger.

In the engine misfire detection device according to the present invention, the misfire index calculation unit calculates a decrease rate of the rotation speed of the supercharger at the top dead center position and regards a deviation of the decrease rate of the rotation speed of the supercharger as the misfire index.

Accordingly, a misfire in the engine can be clearly determined by a misfire in the engine being determined based on the deviation of the decrease rate of the rotation speed of the supercharger.

In the engine misfire detection device according to the present invention, a crank angle measurement unit measuring a crank angle is provided and the misfire determination unit specifies a misfiring cylinder based on the crank angle measured by the crank angle measurement unit when the misfire in the engine is determined.

Accordingly, the misfiring cylinder is specified based on the crank angle when the misfire in the engine is determined, and thus the misfiring cylinder can be detected with high accuracy.

An engine misfire detection method according to the present invention includes a step of measuring a rotation speed of a supercharger, a step of calculating a misfire index from a degree of change in the rotation speed of the supercharger, and a step of determining a misfire in an engine when the misfire index exceeds a pre-set determination value.

The rotation speed of the supercharger hardly fluctuates with vehicle operation states, and thus it is possible to detect a misfire in the engine with high accuracy.

Advantageous Effects of Invention

According to the device and method for detecting a misfire in an engine of the present invention, an engine misfire can be detected with high accuracy.

DESCRIPTION OF EMBODIMENTS

Preferred embodiments of a device and method for detecting a misfire in an engine according to the present invention will be described in detail below with reference to accompanying drawings. It is to be noted that the present invention is not limited by this embodiment. In addition, in a case where there are two or more embodiments, the present invention includes a combination of the embodiments.

First Embodiment

Figure 1:
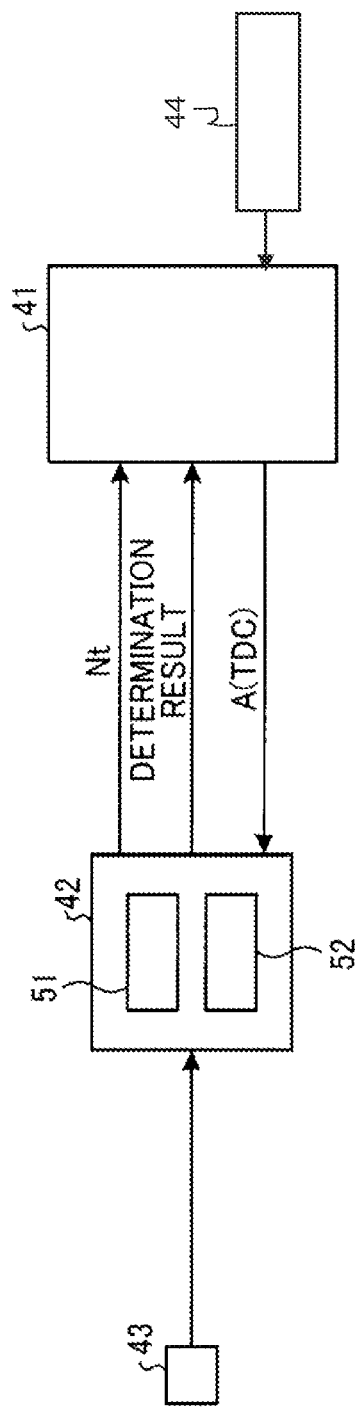
FIG. 1 is a block configuration diagram illustrating an engine misfire detection device according to a first embodiment.
Figure 2:
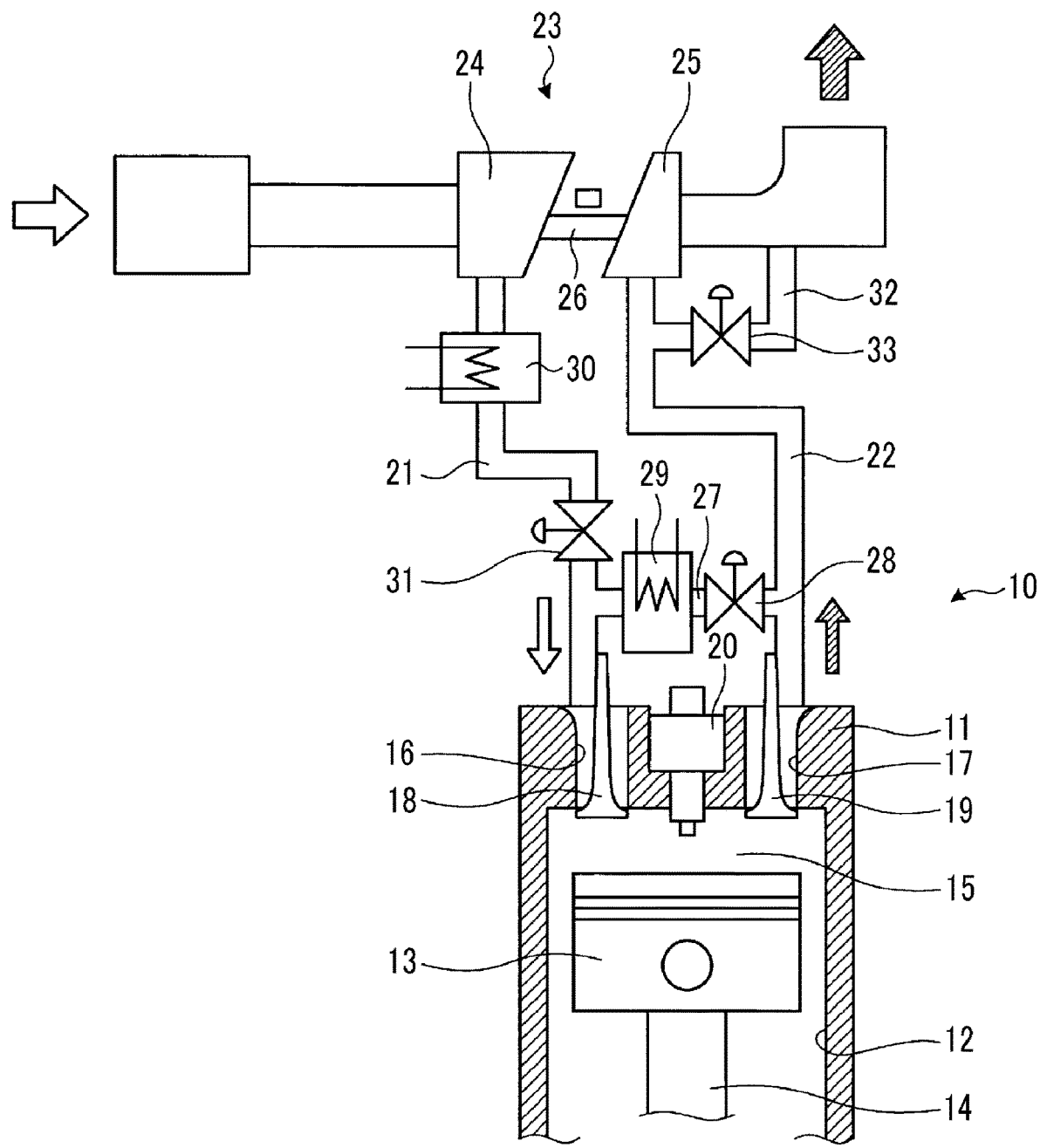
FIG. 2 is a schematic configuration diagram illustrating an engine to which the engine misfire detection device is applied.

FIG. 1 is a block configuration diagram illustrating the engine misfire detection device according to a first embodiment, and FIG. 2 is a schematic configuration diagram illustrating an engine to which the engine misfire detection device is applied.

First, the engine to which the engine misfire detection device of the first embodiment is applied will be described in detail.

As illustrated in FIG. 2, an engine 10 of the first embodiment is a four-cylinder diesel engine. An engine main body 11 is configured by a cylinder head being fastened onto a cylinder block. The engine main body 11 is provided with four cylinder bores 12 (one being illustrated in FIG. 2), and a piston 13 is supported in each cylinder bore 12 via a cylinder liner (not illustrated) so as to freely move upwards and downwards. Although not illustrated, a crankshaft is rotatably supported in the lower portion of the engine main body 11, and each piston 13 is connected to the crankshaft via a connecting rod 14.

A combustion chamber 15 is configured by being partitioned by the wall surface and the lower surface of the cylinder bore 12 and the top surface of the piston 13. An intake port 16 and an exhaust port 17 are formed side by side on the combustion chamber 15, that is, in the engine main body 11. The lower end portions of an intake valve 18 and an exhaust valve 19 are positioned with respect to the intake port 16 and the exhaust port 17, respectively. The intake valve 18 and the exhaust valve 19 are supported in the engine main body 11 so as to be axially movable and are biased and supported in a direction for closing the intake port 16 and the exhaust port 17 (upwards in FIG. 2). The intake valve 18 and the exhaust valve 19 are capable of opening and closing the intake port 16 and the exhaust port 17 by the intake cam and the exhaust cam of an intake camshaft and an exhaust camshaft (not illustrated) acting. A fuel injection valve 20 is provided on the combustion chamber 15, that is, in the engine main body 11. The fuel injection valve 20 is capable of injecting a high-pressure fuel into the combustion chamber 15.

Accordingly, while the crankshaft rotates twice, the engine 10 executes four strokes, that is, intake, compression, expansion, and exhaust strokes. At this time, the intake camshaft and the exhaust camshaft rotate once and the intake valve 18 and the exhaust valve 19 open and close the intake port 16 and the exhaust port 17.

In the engine main body 11, an intake pipe 21 is connected to the intake port 16 and an exhaust pipe 22 is connected to the exhaust port 17. A supercharger 23 is configured by a compressor 24 and a turbine 25 being connected so as to integrally rotate by a rotary shaft 26. In the supercharger 23, the turbine 25 is rotated by exhaust gas flowing through the exhaust pipe 22 of the engine main body 11, the compressor 24 is rotated by the rotation of the turbine 25 being transmitted by the rotary shaft 26, and the compressor 24 compresses air and supplies the air to the engine main body 11 from the intake pipe 21.

An exhaust gas recirculation pipe 27 is provided between the intake pipe 21 and the exhaust pipe 22, and the exhaust gas recirculation pipe 27 is provided with an EGR valve 28 and a cooler 29. On the intake pipe 21, a cooler 30 and an opening and closing valve 31 are provided between the compressor 24 and a connecting portion of the exhaust gas recirculation pipe 27. The exhaust pipe 22 is provided with a bypass pipe 32 bypassing the turbine 25, and the bypass pipe 32 is provided with a waste gate valve 33.

Accordingly, once air is supplied from the intake pipe 21 to the combustion chamber 15, the air is compressed in the engine main body 11 by the piston 13 rising, and the high-pressure fuel ignites spontaneously and burns once the high-pressure fuel is injected from the fuel injection valve 20 to the combustion chamber 15. The resultant combustion gas is discharged to the exhaust pipe 22 as exhaust gas. The exhaust gas discharged from the combustion chamber 15 rotates the turbine 25 in the supercharger 23. As a result, the compressor 24 is rotated via the rotary shaft 26 and supercharging is performed with respect to the combustion chamber 15.

Once the EGR valve 28 is opened, a part of the exhaust gas flows through the exhaust gas recirculation pipe 27 from the exhaust pipe 22 and is sent to the intake pipe 21. The recirculation gas as this exhaust gas is mixed with the air that flows through the intake pipe 21 and supplied to the combustion chamber 15. Once the waste gate valve 33 is opened, the exhaust gas bypasses the turbine 25 by passing through the bypass pipe 32.

As illustrated in FIG. 1, in the engine 10 configured as described above, a sensor signal processing unit 42 is connected to a control device 41. A rotation speed sensor (supercharger rotation speed measurement unit) 43 measuring the rotation speed of the supercharger 23 (see FIG. 2) is connected to the sensor signal processing unit 42. In this case, the rotation speed sensor 43 detects a blade of the compressor 24 or the turbine 25 and outputs the result of the detection to the sensor signal processing unit 42 as a pulse signal. The sensor signal processing unit 42 calculates the rotation speed of the supercharger 23 based on the number of pulse signals per predetermined time.

A crank angle A is input from the control device 41 to the sensor signal processing unit 42. The engine 10 is provided with a crank angle sensor 44 measuring the rotation angle (crank angle) of the crankshaft, the measured crank angle is input to the control device 41, and the control device 41 outputs the input crank angle to the sensor signal processing unit 42. In this case, the crank angle A is input from the control device 41 to the sensor signal processing unit 42. Alternatively, a top dead center (TDC) signal of each cylinder may be input.

The sensor signal processing unit 42 is provided with a misfire index calculation unit 51 and a misfire determination unit 52. The rotation speed sensor (supercharger rotation speed measurement unit) 43 and the sensor signal processing unit 42 (misfire index calculation unit 51 and misfire determination unit 52) constitute the engine misfire detection device according to the first embodiment.

The misfire index calculation unit 51 calculates a misfire index from the degree of change in the rotation speed of the supercharger 23. The misfire determination unit 52 determines a misfire in the engine 10 when the misfire index exceeds a pre-set determination value.

Specifically, the misfire index calculation unit 51 calculates the misfire index based on the degree of change in the rotation speed of the supercharger 23 at the TDC signal (top dead center position) of the piston 13 or the crank angle. At this time, the misfire index calculation unit 51 calculates the decrease rate of the rotation speed of the supercharger 23 at the top dead center position and regards the deviation of the decrease rate as the misfire index. Alternatively, the misfire index calculation unit 51 may regard the decrease rate of the rotation speed of the supercharger 23 at the top dead center position as the misfire index or may regard the deviation of the rotation speed of the supercharger 23 at the top dead center position as the misfire index.

The misfire determination unit 52 determines a misfire in the engine 10 when the misfire index (deviation of rotation speed, decrease rate of rotation speed, deviation of decrease rate of rotation speed) exceeds a pre-set determination value. The determination value, which is experimentally determined in advance, distinguishes between a decline in the rotation speed of the supercharger 23 attributable to a disturbance or the like and a misfire in the engine 10. When the misfire determination unit 52 determines that a misfire in the engine 10 is determined by the misfire index exceeding the determination value, the misfire determination unit 52 specifies the misfiring cylinder based on the TDC signal of the piston 13 or the crank angle.

Figure 3:
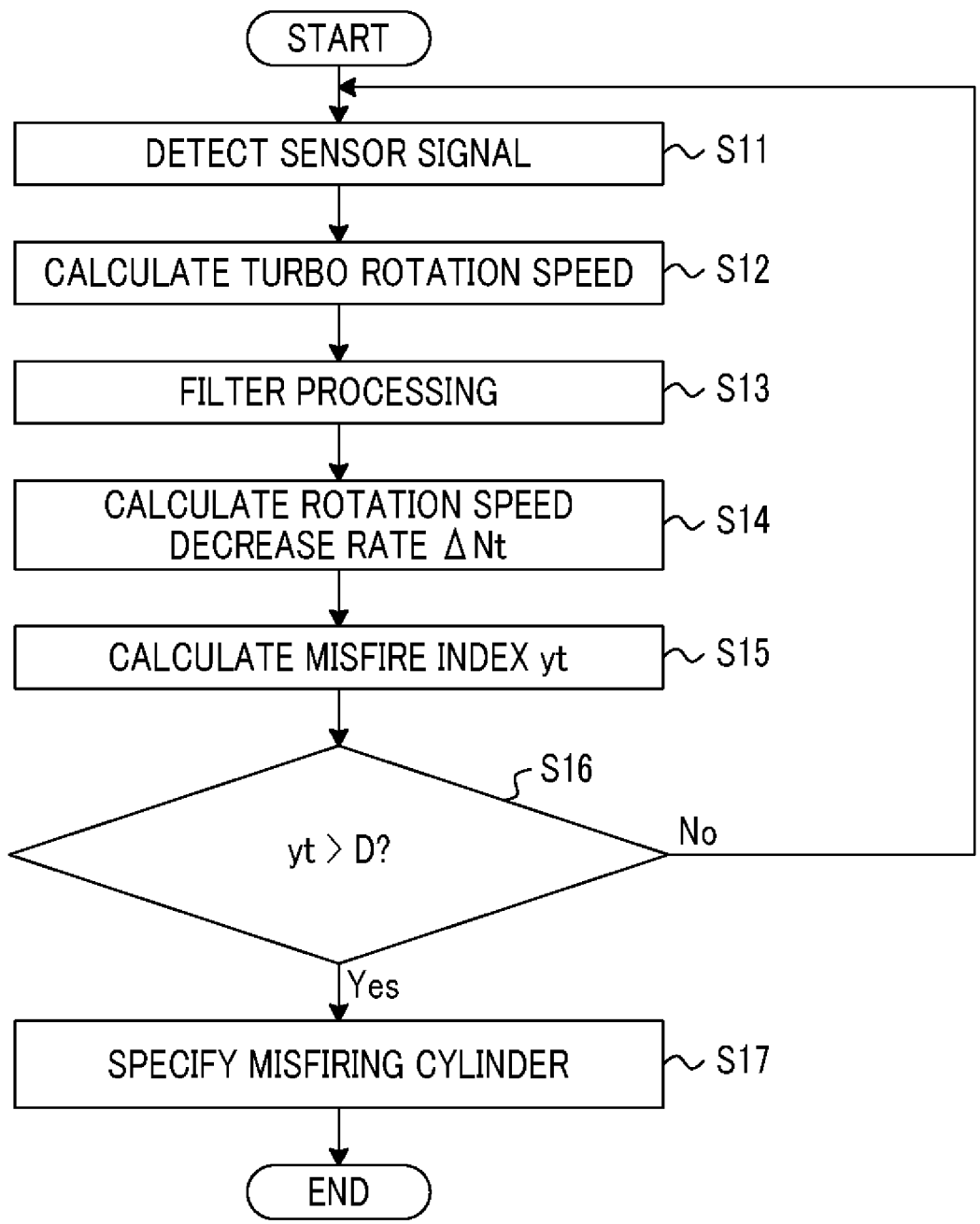
FIG. 3 is a flowchart illustrating an engine misfire detection method.

An engine misfire detection method of the first embodiment will be described in detail. FIG. 3 is a flowchart illustrating the engine misfire detection method.

The engine misfire detection method of the first embodiment includes a step of measuring the rotation speed of the supercharger 23, a step of calculating the misfire index from the degree of change in the rotation speed of the supercharger 23, and a step of determining a misfire in the engine when the misfire index exceeds the pre-set determination value.

As illustrated in FIG. 3, in Step S11, the pulse signal of the blade of the compressor 24 (or turbine 25) is input from the rotation speed sensor 43 to the sensor signal processing unit 42 (misfire index calculation unit 51). In Step S12, the sensor signal processing unit 42 (misfire index calculation unit 51) calculates a rotation speed Nt of the supercharger 23 based on the pulse signal from the rotation speed sensor 43. In Step S13, the sensor signal processing unit 42 (misfire index calculation unit 51) performs filter processing. For example, a low-frequency component, which is a change in rotation speed (acceleration-deceleration component) attributable to vehicle operation, is removed from the rotation speed of the supercharger 23 by means of a high pass filter or a band pass filter and only a high-frequency component, which is a change in rotation speed (axial vibration component) attributable to engine pulsation, is taken out.

In Step S14, the misfire index calculation unit 51 calculates a decrease rate $\Delta Nt$ of the rotation speed Nt of the supercharger 23. At this time, the misfire index calculation unit 51 calculates the decrease rate $\Delta Nt$ of the rotation speed Nt of the supercharger 23 at the top dead center position based on the TDC signal of the piston 13 in each cylinder and by the following Equation (1).

$$\Delta Nt(t_n)=[-1\times\{Nt(t_n)-Nt(t_{n-1})\}/Nt(t_{n-1})]\times 100 \quad (1)$$

In Step S15, the misfire index calculation unit 51 calculates a misfire index yt based on the decrease rate $\Delta Nt$ of the rotation speed Nt of the supercharger 23 and by the following Equation (2).

$$yt(t_n)=-\Delta Nt(t_n)+\Delta Nt(t_{n-1}) \quad (2)$$

In Step S16, the sensor signal processing unit 42 (misfire determination unit 52) determines whether or not the misfire index yt is above a pre-set determination value D. Once it is determined that the misfire index yt is equal to or less than the determination value D (No), the processing returns to Step S11 and continues. Once it is determined that the misfire index yt is above the determination value D (Yes), the misfiring cylinder of the engine 10 is determined in Step S17. Specifically, it is determined that a cylinder that is at the top dead center position ahead of a cylinder that is at the top dead center position when the misfire index yt exceeds the determination value D is the misfiring cylinder.

Figure 4:
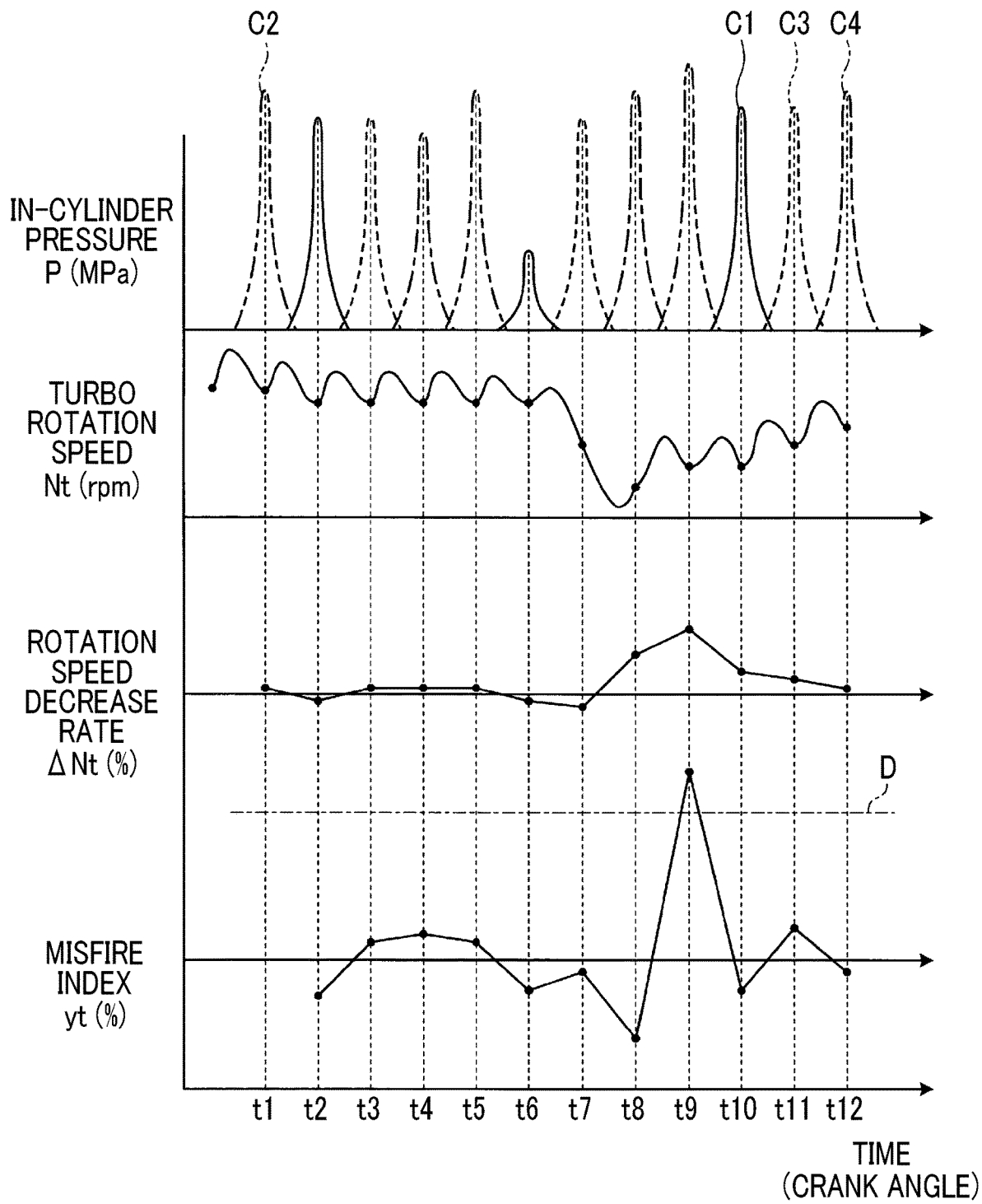
FIG. 4 is a time chart illustrating misfire determination processing during steady-state operation.

A specific case will be exemplified below. FIG. 4 is a time chart illustrating misfire determination processing during steady-state operation, and FIG. 5 is a time chart illustrating misfire determination processing during acceleration operation.

As illustrated in FIG. 4, the engine 10 of the first embodiment is a four-cylinder engine in which the piston reaches the top dead center position in the order of a second cylinder C2, a first cylinder C1, a third cylinder C3, and a fourth cylinder C4. During steady-state vehicle operation, the cylinders C2, C1, C3, and C4 respectively reach the top dead center position in the order of time t1, t2, t3, t4, . . . , and an in-cylinder pressure P of each reaches its maximum at this time. At this time, for example, the second cylinder C2 reaching the top dead center at time t1 enters an exhaust step at time t3, and thus the rotation speed Nt of the supercharger 23 begins to rise at time t3.

Assuming that the first cylinder C1 misfires at time t6, for example, the in-cylinder pressure of the first cylinder C1 at time t6 decreases and the rotation speed Nt of the supercharger 23 at time t8, when the first cylinder C1 enters an exhaust step, decreases. Then, the rotation speed decrease rate $\Delta Nt$ rises at time t9, and the misfire index yt rises and exceeds the determination value D at this time t9. Accordingly, it can be determined that the first cylinder C1 where the piston 13 is at the top dead center position (time t6) three strokes ahead of time t9 when the misfire index yt exceeds the determination value D misfires at a timing when the misfire index yt exceeds the determination value D.

Figure 5:
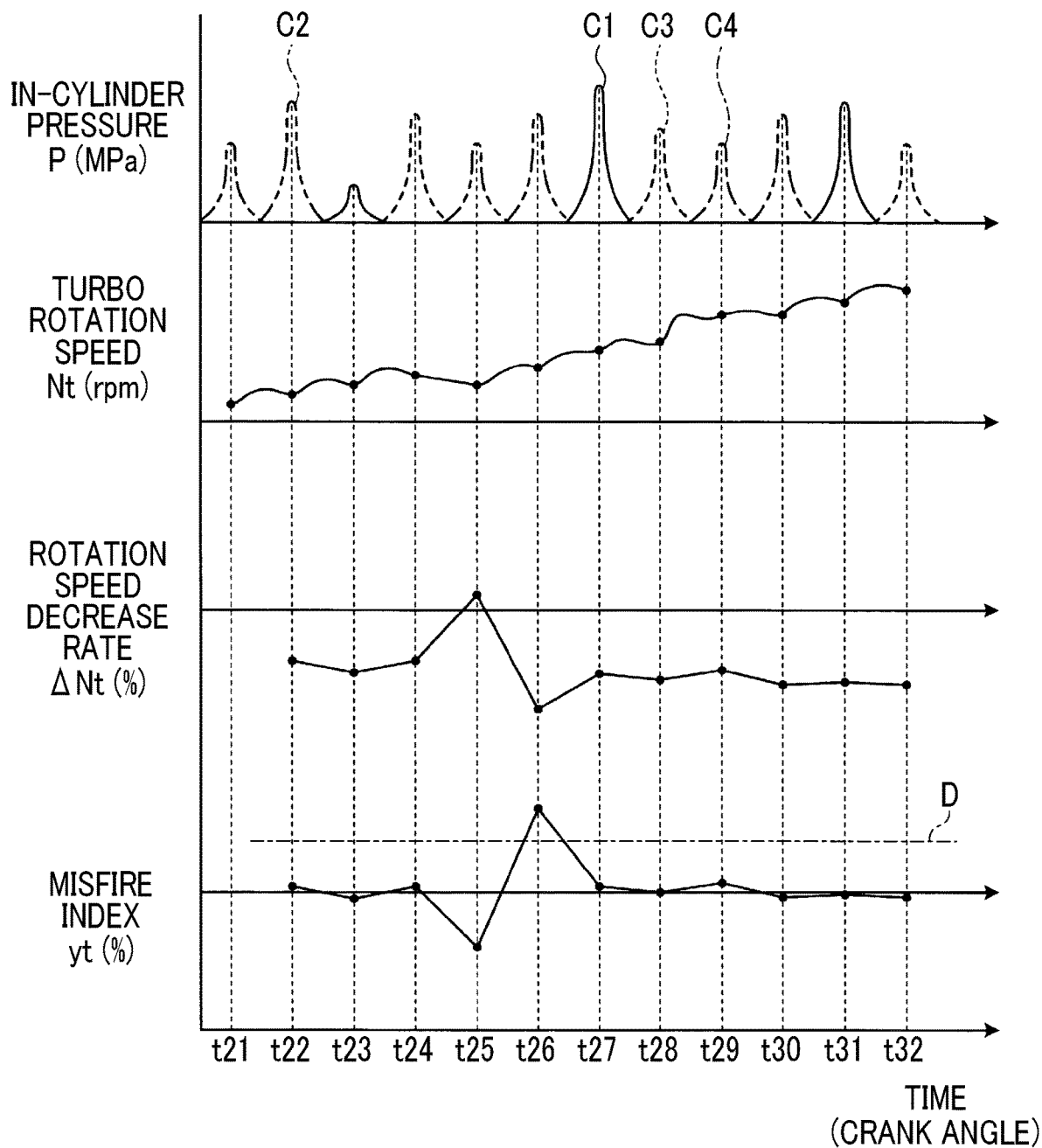
FIG. 5 is a time chart illustrating misfire determination processing during acceleration operation.

Assuming that the first cylinder C1 misfires at time t23 during vehicle acceleration operation, for example, the in-cylinder pressure of the first cylinder C1 at time t25 decreases and the rotation speed Nt of the supercharger 23 at time t26, when the first cylinder C1 enters an exhaust step, decreases as illustrated in FIG. 5. Then, the rotation speed decrease rate $\Delta Nt$ rises at time t26, and the misfire index yt rises and exceeds the determination value D at this time t26. Accordingly, it can be determined that the first cylinder C1 where the piston 13 is at the top dead center position (time t23) three strokes ahead of time t26 when the misfire index yt exceeds the determination value D misfires at a timing when the misfire index yt exceeds the determination value D.

In the above description, misfire determination during steady-state vehicle operation and misfire determination during vehicle acceleration operation have been described. A determination can be made during deceleration operation as well. In this case, it is desirable to set a determination value lower than those set for the misfire determination during steady-state vehicle operation and the misfire determination during vehicle acceleration operation. Still, fuel cut control may be executed during vehicle deceleration operation, and an alternative configuration may be adopted in which misfire determination is stopped during fuel cut control or misfire determination is stopped during vehicle deceleration operation.

As described above, the engine misfire detection device according to the first embodiment includes the rotation speed sensor (supercharger rotation speed measurement unit) 43 measuring the rotation speed Nt of the supercharger 23, the misfire index calculation unit 51 calculating the misfire index Yt from the degree of change in the rotation speed Nt of the supercharger 23 measured by the rotation speed sensor 43, and the misfire determination unit 52 determining a misfire in the engine 10 when the misfire index yt calculated by the misfire index calculation unit 51 exceeds the pre-set determination value D.

Accordingly, once the rotation speed sensor 43 measures the rotation speed Nt of the supercharger 23 and the misfire index calculation unit 51 calculates the misfire index yt from the degree of change in the rotation speed Nt of the supercharger 23, the misfire determination unit 52 determines a misfire in the engine 10 when the misfire index yt exceeds the determination value D, and thus a misfire in the engine 10 is determined from the degree of change in the rotation speed Nt of the supercharger 23. The supercharger 23 is not connected to the crankshaft and is not affected by a road surface, and thus the rotation speed Nt of the supercharger 23 hardly fluctuates with vehicle operation states. In addition, the single supercharger 23 is applied with respect to multiple cylinders, and thus the moment of inertia of the supercharger 23 is small. Therefore, it is possible to detect a misfire in the engine 10 with high accuracy.

In the engine misfire detection device according to the first embodiment, the misfire index calculation unit 51 calculates the misfire index yt based on the degree of change in the rotation speed Nt of the supercharger 23 at the top dead center position of the piston 13 entailed by crankshaft rotation. Accordingly, if the engine 10 undergoes no misfire when the piston 13 is at the top dead center position, the in-cylinder pressure P is at its maximum and rotation of the turbine 25 rotated by exhaust gas from that cylinder also rises. Therefore, a misfire in the engine 10 can be determined with high accuracy by a misfire in the engine 10 being determined based on the degree of change in the rotation speed Nt of the supercharger 23 at this time.

In the engine misfire detection device according to the first embodiment, the misfire index calculation unit 51 regards the decrease rate ΔNt of the rotation speed Nt of the supercharger 23 at the top dead center position as the misfire index yt. Accordingly, a misfire in the engine 10 can be clearly determined by a misfire in the engine 10 being determined based on the decrease rate ΔNt of the rotation speed Nt of the supercharger 23.

In the engine misfire detection device according to the first embodiment, the misfire index calculation unit 51 calculates the decrease rate ΔNt of the rotation speed Nt of the supercharger 23 at the top dead center position and regards the deviation of the decrease rate ΔNt of the rotation speed Nt of the supercharger 23 as the misfire index yt. Accordingly, a misfire in the engine 10 can be clearly determined by a misfire in the engine 10 being determined based on the deviation of the decrease rate ΔNt of the rotation speed Nt of the supercharger 23.

In the engine misfire detection device according to the first embodiment, the misfire determination unit 52 specifies the misfiring cylinder based on the TDC signal or the crank angle when a misfire in the engine 10 is determined. Accordingly, the misfiring cylinder can be detected with high accuracy.

In the engine misfire detection device according to the first embodiment, a determination on a misfire in the engine 10 is made by the sensor signal processing unit 42 provided separately from the control device 41, and thus a high-performance control device does not have to be provided and an increase in product cost can be suppressed.

In the engine misfire detection device according to the first embodiment, a misfire in the engine 10 can be determined during any of steady-state vehicle operation, vehicle acceleration operation, and vehicle deceleration operation.

The misfire detection method according to the first embodiment includes the step of measuring the rotation speed Nt of the supercharger 23, the step of calculating the misfire index yt from the degree of change in the rotation speed Nt of the supercharger 23, and the step of determining a misfire in the engine 10 when the misfire index yt exceeds the pre-set determination value D. Accordingly, since the rotation speed Nt of the supercharger 23 hardly fluctuates with vehicle operation states, a misfire in the engine 10 can be detected with high accuracy.

Second Embodiment

Figure 6:
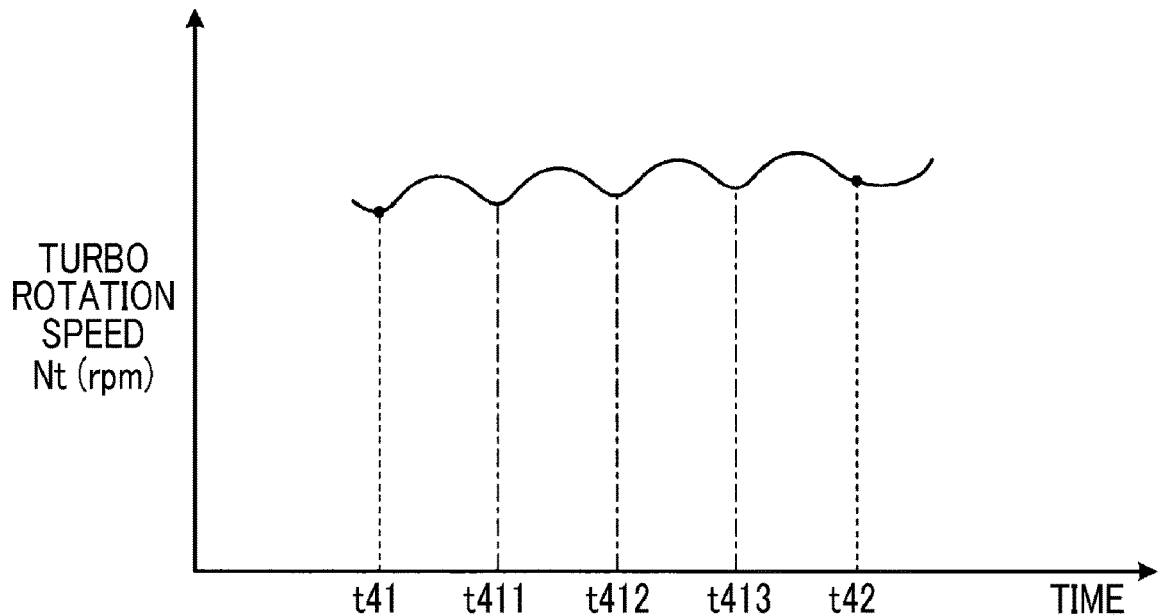
FIG. 6 is a time chart illustrating misfire determination processing in an engine misfire detection device of a second embodiment.

FIG. 6 is a time chart illustrating misfire determination processing in an engine misfire detection device of a second embodiment. The basic configuration of the engine misfire detection device according to the present embodiment is substantially the same as that of the first embodiment described above and will be described with reference to FIG. 1. Members having the same functions as those of the first embodiment described above will be denoted by the same reference numerals, and detailed description thereof will be omitted.

As illustrated in FIG. 1, in the second embodiment, the sensor signal processing unit 42 is connected to the control device 41. The rotation speed sensor 43 measuring the rotation speed of the supercharger 23 (see FIG. 2) is connected to the sensor signal processing unit 42. A top dead center (TDC) signal of one cylinder is input from the control device 41 to the sensor signal processing unit 42.

The sensor signal processing unit 42 is provided with the misfire index calculation unit 51 and the misfire determination unit 52. The rotation speed sensor 43 and the misfire index calculation unit 51 and the misfire determination unit 52 as the sensor signal processing unit 42 constitute the engine misfire detection device according to the first embodiment.

The misfire index calculation unit 51 estimates the top dead center position of the piston 13 in the remaining three cylinders based on the TDC signal (top dead center position) of the piston 13 in one cylinder. In other words, as illustrated in FIG. 6, once the TDC signal of the piston 13 in one cylinder is input at each of time t41 and time t42, the time between time t41 and time t42 is divided by the number of cylinders (divided by four cylinders in the present embodiment), and then the top dead center positions of the piston 13 in the remaining three cylinders can be calculated as time t411, time t412, and time t413. In other words, an interval t between time t41 and time t411 can be calculated by the following equation, an engine rotation speed Ne, and a number Cn of cylinders.

$$t=[2/(Ne/60)]\times[1/Cn]$$

The misfire index calculation unit 51 calculates the misfire index based on the degree of change in the rotation speed of the supercharger 23 at the TDC signal (top dead center position) of the piston 13 in one cylinder and the estimated top dead center position of the piston 13 in the remaining three cylinders. At this time, the misfire index calculation unit 51 calculates the decrease rate of the rotation speed of the supercharger 23 at the top dead center position and regards the deviation of the decrease rate as the misfire index.

The misfire determination unit 52 determines a misfire in the engine 10 when the misfire index exceeds a pre-set determination value. The determination value, which is experimentally determined in advance, distinguishes between a decline in the rotation speed of the supercharger 23 attributable to a disturbance or the like and a misfire in the engine 10. When the misfire determination unit 52 determines that a misfire in the engine 10 is determined by the misfire index exceeding the determination value, the misfire determination unit 52 specifies the misfiring cylinder based on the TDC signal of the piston 13 or the crank angle.

Misfire determination for the engine 10 is the same as that of the first embodiment described above, and description thereof will be omitted.

As described above, in the engine misfire detection device according to the second embodiment, the misfire index calculation unit 51 estimates the top dead center position of the piston 13 in the remaining three cylinders based on the TDC signal (top dead center position) of the piston 13 in one cylinder and determines a misfire in the engine 10 based on the rotation speed Nt of the supercharger 23 at each top dead center position even in a case where the sensor signal processing unit 42 knows only the top dead center position of the piston 13 in one cylinder. Accordingly, a misfire in the engine 10 can be detected with high accuracy by a misfire in the engine 10 being determined based on the rotation speed Nt of the supercharger 23.

Third Embodiment

Figure 7:
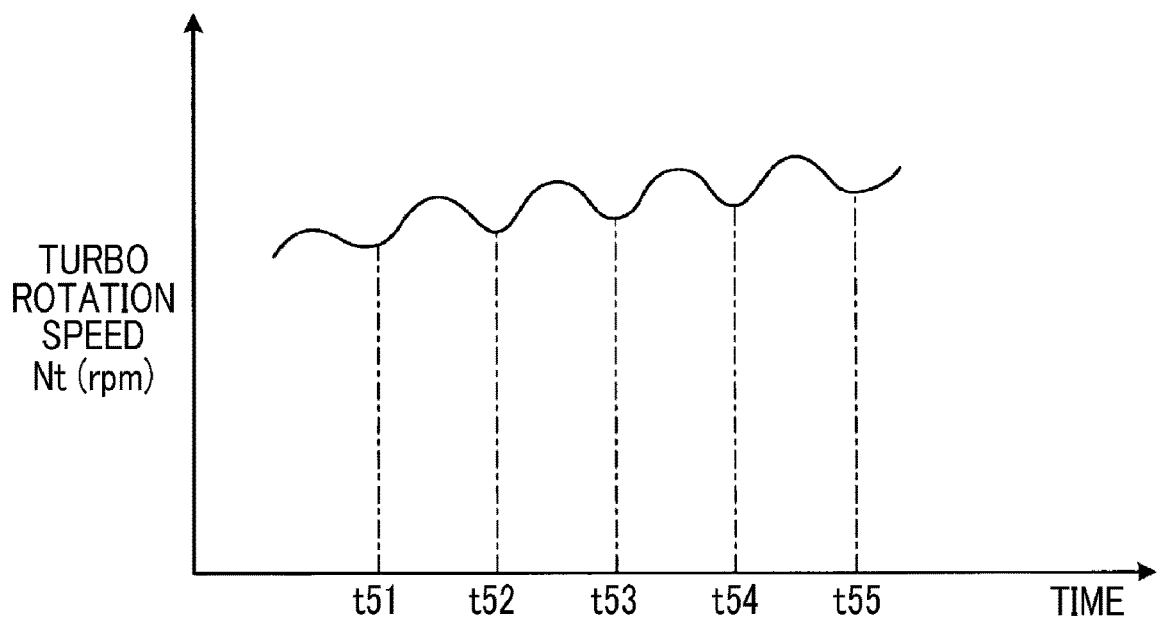
FIG. 7 is a time chart illustrating misfire determination processing in an engine misfire detection device of a third embodiment.

FIG. 7 is a time chart illustrating misfire determination processing in an engine misfire detection device of a third embodiment. The basic configuration of the engine misfire detection device according to the present embodiment is substantially the same as that of the first embodiment described above and will be described with reference to FIG. 1. Members having the same functions as those of the first embodiment described above will be denoted by the same reference numerals, and detailed description thereof will be omitted.

As illustrated in FIG. 1, in the third embodiment, the sensor signal processing unit 42 is connected to the control device 41. The rotation speed sensor 43 measuring the rotation speed of the supercharger 23 (see FIG. 2) is connected to the sensor signal processing unit 42. A top dead center (TDC) signal of one cylinder is input from the control device 41 to the sensor signal processing unit 42.

The sensor signal processing unit 42 is provided with the misfire index calculation unit 51 and the misfire determination unit 52. The rotation speed sensor 43 and the misfire index calculation unit 51 and the misfire determination unit 52 as the sensor signal processing unit 42 constitute the engine misfire detection device according to the first embodiment.

The misfire index calculation unit 51 estimates the top dead center position of the piston 13 in each cylinder based on the rotation speed Ne of the engine 10 and the rotation speed Nt of the supercharger 23. In other words, as illustrated in FIG. 7, the timing of the low value of the rotation speed Nt of the supercharger 23 is set to times t51, t52, t53, t54, t55, . . . and the times t51, t52, t53, t54, t55, . . . can be estimated as the top dead center position of each cylinder. In other words, an interval t between time t51 and time t55 can be calculated by the following equation, the rotation speed Ne of the engine 10, and the number Cn of cylinders.

$$t=[2/(Ne/60)]\times[1/Cn]$$

The misfire index calculation unit 51 calculates the misfire index based on the degree of change in the rotation speed of the supercharger 23 at the TDC signal (top dead center position) of the piston 13 in one cylinder and the estimated top dead center position of the piston 13 in the remaining three cylinders. At this time, the misfire index calculation unit 51 calculates the decrease rate of the rotation speed of the supercharger 23 at the top dead center position and regards the deviation of the decrease rate as the misfire index.

The misfire determination unit 52 determines a misfire in the engine 10 when the misfire index exceeds a pre-set determination value. The determination value, which is experimentally determined in advance, distinguishes between a decline in the rotation speed of the supercharger 23 attributable to a disturbance or the like and a misfire in the engine 10.

Misfire determination for the engine 10 is the same as that of the first embodiment described above, and description thereof will be omitted.

As described above, in the engine misfire detection device according to the third embodiment, the misfire index calculation unit 51 estimates the top dead center position of the piston 13 in each cylinder based on the rotation speed Ne of the engine 10 and the rotation speed Nt of the supercharger 23 and determines a misfire in the engine 10 based on the rotation speed Nt of the supercharger 23 at each top dead center position even in a case where the sensor signal processing unit 42 knows only the rotation speed Ne of the engine 10. Accordingly, a misfire in the engine 10 can be detected with high accuracy by a misfire in the engine 10 being determined based on the rotation speed Nt of the supercharger 23.

In the above embodiment, the misfire determination unit 52 is configured to determine a misfire in the engine 10 when the misfire index yt calculated by the misfire index calculation unit 51 exceeds the pre-set determination value D. However, the present invention is not limited to this configuration. For example, a determination map may be prepared in which the determination value D also rises in accordance with a rise in the load of the engine 10 (engine rotation speed, supercharger rotation speed, fuel injection amount, in-cylinder pressure, and so on) and a misfire in the engine 10 may be determined by means of the determination map.

In the above-described embodiment, the sensor signal processing unit 42 is configured to determine a misfire in the engine 10 based on the rotation speed Nt of the supercharger 23. Alternatively, the control device 41 controlling the engine 10 may determine a misfire in the engine 10 based on the rotation speed Nt of the supercharger 23 without the sensor signal processing unit 42 being provided. In other words, the control device 41 may be provided with the misfire index calculation unit 51 and the misfire determination unit 52 of the sensor signal processing unit 42 and the control device 41 may determine a misfire in the engine 10.

REFERENCE SIGNS LIST

10 Engine
11 Engine main body
13 Piston
15 Combustion chamber
23 Supercharger
24 Compressor
25 Turbine
26 Rotary shaft
41 Control device
42 Sensor signal processing unit
43 Rotation speed sensor (supercharger rotation speed measurement unit)
51 Misfire index calculation unit
52 Misfire determination unit

The invention claimed is:

1. An engine misfire detection device comprising:
a rotation speed sensor measuring a rotation speed of a supercharger,
a sensor signal processing unit configured to:
calculate a misfire index yt from a degree of change in the rotation speed of the supercharger measured by the rotation speed sensor; and
determine a misfire in an engine when the calculated misfire index yt exceeds a pre-set determination value, wherein
the misfire index calculating calculates the misfire index yt based on a decrease rate $\Delta Nt$ of the rotation speed of the supercharger, the decrease rate $\Delta Nt$ being calculated by using the following equation (1):

$$\Delta Nt(t_n) = [-1 \times \{Nt(t_n) - Nt(t_{n-1})\} / Nt(t_{n-1})] \times 100 \quad (1)$$

where $Nt(t_n)$ is the rotation speed of the supercharger at a measurement time $t_n$ which any one of pistons included in the engine reaches a top dead center position, and $Nt(t_{n-1})$ is a rotation speed of the supercharger at a measurement time $t_{n-1}$ which another piston reaches a top dead center position, the measurement time $t_{n-1}$ is one measurement time before $t_n$.

2. The engine misfire detection device according to claim 1, wherein the misfire index calculating calculates as the misfire index yt based on the decrease rate $\Delta Nt$ of the rotation speed Nt of the supercharger and by using the following equation (2)

$$yt(t_n) = -\Delta Nt(t_n) + \Delta Nt(t_{n-1}) \quad (2).$$

3. The engine misfire detection device according to claim 1, wherein a crank angle sensor measuring a crank is provided and the misfire determining specifies a misfiring cylinder based on the crank angle measured by the crank angle sensor when the misfire in the engine is determined.

4. An engine misfire detection method comprising:
measuring a rotation speed of a supercharger;
calculating a misfire index yt from a degree of change in the rotation speed of the supercharger; and
determining a misfire in an engine when the misfire index yt exceeds a pre-set determination value, wherein
at the calculating the misfire index yt, the misfire index yt is calculated based on a decrease rate $\Delta Nt$ of the rotation speed of the supercharger, the decrease rate $\Delta Nt$ being calculated by using the following equation.:

$$\Delta Nt(t_n) = [-1 \times \{Nt(t_n) - Nt(t_{n-1})\} / Nt(t_{n-1})] \times 100 \quad (1)$$

where $Nt(t_n)$ is the rotation speed of the supercharger at a measurement time $t_n$ which any one of pistons included in the engine reaches a top dead center position, and $Nt(t_{n-1})$ is a rotation speed of the supercharger at a measurement time $t_{n-1}$ which another piston reaches a top dead center position, the measurement time $t_{1-1}$ is one measurement before $t_1$.

5. The engine misfire detection device according to claim 2, wherein a crank angle sensors measuring a crank angle is provided and the misfire determining specifies a misfiring cylinder based on the crank angle measured by the crank angle sensor when the misfire in the engine is determined.

6. The engine misfire detection method according to claim 4, wherein the calculating of the misfire index yt is performed based on the decrease rate $\Delta Nt$ of the rotation speed Nt of the supercharger and by using the following equation (2):

$$yt(t_n) = -\Delta Nt(t_n) + \Delta Nt(t_{n-1}) \quad (2).$$

7. The engine s ire detection m method according to claim 4, further comprising:
measuring a crank angle, and
specifying a misfiring cylinder based on the measured crank angle when the misfire in the engine is determined.

* * * * *